US007020680B2

(12) United States Patent
Defossé

(10) Patent No.: US 7,020,680 B2
(45) Date of Patent: *Mar. 28, 2006

(54) SYSTEM AND METHOD FOR MONITORING AND CONTROL OF BEVERAGE DISPENSING EQUIPMENT

(75) Inventor: Erin M. Defossé, Austin, TX (US)

(73) Assignee: Isochron, LLC, Austin, TX (US)

(*) Notice: Subject to any disclaimer, the term of this patent is extended or adjusted under 35 U.S.C. 154(b) by 718 days.

This patent is subject to a terminal disclaimer.

(21) Appl. No.: 09/923,046

(22) Filed: Aug. 6, 2001

(65) Prior Publication Data

US 2001/0054083 A1  Dec. 20, 2001

Related U.S. Application Data

(63) Continuation-in-part of application No. 09/267,254, filed on Mar. 12, 1999.

(60) Provisional application No. 60/078,645, filed on Mar. 19, 1998, provisional application No. 60/224,097, filed on Aug. 9, 2000, provisional application No. 60/099,434, filed on Sep. 8, 1998.

(51) Int. Cl.
*G06F 15/16* (2006.01)

(52) U.S. Cl. .......................... 709/201; 705/28

(58) Field of Classification Search ............... 709/200, 709/236, 217; 700/78, 224; 705/14, 25, 705/40, 28; 702/188; 713/175
See application file for complete search history.

(56) References Cited

U.S. PATENT DOCUMENTS

| 3,784,737 A | 1/1974 | Waehner ........................ 178/6 |
| 4,369,442 A | 1/1983 | Werth et al. ........... 340/825.35 |
| 4,412,292 A | 10/1983 | Sedam et al. ............... 364/479 |
| 4,454,670 A | 6/1984 | Bachmann et al. ........... 40/584 |
| 4,553,211 A | 11/1985 | Kawasaki et al. .......... 364/479 |
| 4,661,862 A | 4/1987 | Thompson ................... 358/335 |
| 4,677,565 A | 6/1987 | Ogaki et al. ................. 364/479 |
| 4,766,548 A | 8/1988 | Cedrone et al. ............. 364/479 |
| 4,850,009 A | 7/1989 | Zook et al. ..................... 379/96 |
| 4,926,996 A | 5/1990 | Eglise et al. ................. 194/212 |
| 4,954,697 A | 9/1990 | Kokubun et al. ........... 235/381 |
| 5,029,098 A | 7/1991 | Levasseur ................... 364/479 |
| 5,077,582 A | 12/1991 | Kravette et al. ............ 355/206 |
| 5,090,589 A | 2/1992 | Brandes et al. ................. 221/2 |
| 5,091,713 A | 2/1992 | Horne et al. ................. 340/541 |
| 5,117,407 A | 5/1992 | Vogel ........................... 369/30 |
| 5,184,179 A | 2/1993 | Tarr et al. .................... 355/206 |
| 5,207,784 A | 5/1993 | Schwartzendruber .......... 221/6 |

(Continued)

FOREIGN PATENT DOCUMENTS

DE  41 40 450 A1  6/1993

(Continued)

OTHER PUBLICATIONS

International Search Report PCT/US 03/37776, Mailed May 17, 2004.

(Continued)

*Primary Examiner*—Andrew Caldwell
*Assistant Examiner*—Stephan Willett
(74) *Attorney, Agent, or Firm*—Baker Botts L.L.P.

(57) ABSTRACT

A remote data acquisition and transmission system and method are disclosed. A plurality of application controllers are interfaced with remote beverage dispensing equipment from which operation data is acquired by the application controllers. The application controllers communicate with an application host via a local area network, and the application host can communicate with a network operations center using a wide area network interface.

25 Claims, 9 Drawing Sheets

U.S. PATENT DOCUMENTS

| | | | |
|---|---|---|---|
| 5,239,480 A | 8/1993 | Huegel | 364/479 |
| 5,255,819 A | 10/1993 | Peckels | 222/1 |
| 5,282,127 A | 1/1994 | Mii | 364/479 |
| 5,337,253 A | 8/1994 | Berkovsky et al. | 364/479 |
| 5,339,250 A | 8/1994 | Durbin | 364/479 |
| 5,371,348 A | 12/1994 | Kumar et al. | 235/472 |
| 5,386,360 A | 1/1995 | Wilson et al. | 364/146 |
| 5,400,246 A | 3/1995 | Wilson et al. | 364/146 |
| 5,418,945 A | 5/1995 | Carter et al. | 395/600 |
| 5,445,295 A | 8/1995 | Brown | 221/3 |
| 5,505,349 A | 4/1996 | Peckels | 222/641 |
| 5,507,411 A | 4/1996 | Peckels | 222/1 |
| 5,561,604 A | 10/1996 | Buckley et al. | 364/479.05 |
| 5,608,643 A | 3/1997 | Wichter et al. | 364/479.14 |
| 5,620,079 A | 4/1997 | Molbak | 194/217 |
| 5,649,308 A | 7/1997 | Andrews | 370/334 |
| 5,671,362 A | 9/1997 | Cowe et al. | 395/228 |
| 5,701,252 A | 12/1997 | Facchin et al. | 364/479 |
| 5,708,223 A | 1/1998 | Wyss | 73/865.9 |
| 5,769,269 A | 6/1998 | Peters | 221/7 |
| 5,787,149 A | 7/1998 | Yousefi et al. | 379/59 |
| 5,794,144 A | 8/1998 | Comer et al. | 455/426 |
| 5,805,997 A | 9/1998 | Farris | 455/461 |
| 5,815,652 A | 9/1998 | Ote et al. | 395/183.07 |
| 5,818,603 A | 10/1998 | Motoyama | 358/296 |
| 5,822,216 A | 10/1998 | Satchell, Jr. et al. | 364/479.01 |
| 5,841,866 A | 11/1998 | Bruwer et al. | 380/23 |
| 5,842,597 A | 12/1998 | Kraus et al. | 221/150 R |
| 5,844,808 A | 12/1998 | Konsmo et al. | 364/479.14 |
| 5,850,187 A | 12/1998 | Carrender et al. | 340/825.54 |
| 5,860,362 A | 1/1999 | Smith | 101/494 |
| 5,862,517 A | 1/1999 | Honey et al. | |
| 5,867,688 A | 2/1999 | Simmon et al. | 395/500 |
| 5,892,758 A | 4/1999 | Argyoudis | |
| 5,898,904 A | 4/1999 | Wang | 455/31.3 |
| 5,905,442 A | 5/1999 | Mosebrook et al. | |
| 5,905,882 A | 5/1999 | Sakagami et al. | |
| 5,907,491 A | 5/1999 | Canada et al. | 364/468.15 |
| 5,909,183 A | 6/1999 | Borgstahl et al. | |
| 5,915,207 A | 6/1999 | Dao et al. | 455/9 |
| 5,918,213 A | 6/1999 | Bernard et al. | 705/26 |
| 5,924,081 A | 7/1999 | Ostendorf et al. | 705/30 |
| 5,930,770 A | 7/1999 | Edgar | 705/28 |
| 5,930,771 A | 7/1999 | Stapp | 705/28 |
| 5,941,363 A | 8/1999 | Partyka et al. | 194/217 |
| 5,943,042 A | 8/1999 | Siio | 345/172 |
| 5,949,779 A | 9/1999 | Mostafa et al. | |
| 5,956,487 A | 9/1999 | Venkatraman et al. | |
| 5,957,262 A | 9/1999 | Molbak et al. | 194/200 |
| 5,959,536 A | 9/1999 | Chamberts et al. | |
| 5,959,869 A | 9/1999 | Miller et al. | 364/479.1 |
| 5,979,757 A | 11/1999 | Tracy et al. | 235/383 |
| 5,982,325 A | 11/1999 | Thornton et al. | 342/357.07 |
| 5,982,652 A | 11/1999 | Simonelli et al. | 363/142 |
| 5,986,219 A | 11/1999 | Carroll et al. | 177/1 |
| 5,991,749 A | 11/1999 | Morrill, Jr. | 705/44 |
| 5,997,170 A | 12/1999 | Brodbeck | 364/479.06 |
| 6,003,070 A | 12/1999 | Frantz | |
| 6,005,850 A | 12/1999 | Moura et al. | 370/282 |
| 6,012,041 A | 1/2000 | Brewer et al. | 705/28 |
| 6,021,324 A | 2/2000 | Sizer, II et al. | |
| 6,021,437 A | 2/2000 | Chen et al. | 709/224 |
| 6,029,143 A | 2/2000 | Mosher et al. | 705/28 |
| 6,032,202 A | 2/2000 | Lea et al. | |
| 6,038,491 A | 3/2000 | McGarry et al. | 700/231 |
| 6,052,667 A | 4/2000 | Walker et al. | 705/15 |
| 6,052,750 A | 4/2000 | Lea | |
| 6,056,194 A | 5/2000 | Kolls | 235/381 |
| 6,057,758 A | 5/2000 | Dempsey et al. | 340/539 |
| 6,061,668 A | 5/2000 | Sharrow | 705/400 |
| 6,068,305 A | 5/2000 | Myers et al. | 292/201 |
| 6,070,070 A | 5/2000 | Ladue | 455/419 |
| 6,072,521 A | 6/2000 | Harrison et al. | 348/12 |
| 6,084,528 A | 7/2000 | Beach et al. | 340/825.35 |
| 6,085,888 A | 7/2000 | Tedesco et al. | 194/217 |
| 6,119,100 A | 9/2000 | Walker et al. | 705/20 |
| 6,124,800 A | 9/2000 | Beard et al. | 340/825.35 |
| 6,131,399 A | 10/2000 | Hall | 62/127 |
| 6,161,059 A | 12/2000 | Tedesco et al. | 700/232 |
| 6,163,811 A | 12/2000 | Porter | 709/247 |
| 6,181,981 B1 | 1/2001 | Varga et al. | 700/236 |
| 6,185,545 B1 | 2/2001 | Resnick et al. | 705/40 |
| 6,199,753 B1 | 3/2001 | Tracy et al. | 235/375 |
| 6,230,150 B1 | 5/2001 | Walker et al. | 705/400 |
| 6,272,395 B1 | 8/2001 | Brodbeck | 700/236 |
| 6,289,453 B1 | 9/2001 | Walker et al. | 713/175 |
| 6,304,895 B1 | 10/2001 | Schneider et al. | 709/203 |
| 6,324,520 B1 | 11/2001 | Walker et al. | 705/16 |
| 6,338,149 B1 | 1/2002 | Ciccone, Jr. et al. | 714/38 |
| 6,339,731 B1 | 1/2002 | Morris et al. | 700/236 |
| 6,341,271 B1 | 1/2002 | Salvo et al. | 705/28 |
| 6,356,794 B1 | 3/2002 | Perin, Jr. et al. | 700/78 |
| 6,385,772 B1 | 5/2002 | Courtney | 725/105 |
| 6,437,692 B1 | 8/2002 | Petite et al. | 340/540 |
| 6,442,532 B1 | 8/2002 | Kawan | 705/35 |
| 6,457,038 B1 | 9/2002 | Defosse | 709/200 |
| 6,462,644 B1 | 10/2002 | Howell et al. | 340/5.92 |
| 6,467,685 B1 | 10/2002 | Teicher | 235/379 |
| 6,502,131 B1 | 12/2002 | Vaid et al. | 709/224 |
| 6,505,095 B1 | 1/2003 | Kolls | 700/244 |
| 6,525,644 B1 | 2/2003 | Stillwagon | 340/5.61 |
| 6,550,672 B1 | 4/2003 | Tracy et al. | 235/383 |
| 6,553,336 B1 | 4/2003 | Johnson et al. | 702/188 |
| 6,581,986 B1 | 6/2003 | Roatis et al. | 292/199 |
| 6,584,309 B1 | 6/2003 | Whigham | 455/414 |
| 6,604,086 B1 * | 8/2003 | Kolls | 705/14 |
| 6,604,087 B1 | 8/2003 | Kolls | 705/14 |
| 6,606,602 B1 | 8/2003 | Kolls | 705/14 |
| 6,606,605 B1 | 8/2003 | Kolls | 705/26 |
| 6,609,113 B1 | 8/2003 | O'Leary et al. | 705/39 |
| 6,704,714 B1 | 3/2004 | O'Leary et al. | 705/39 |
| 6,712,266 B1 | 3/2004 | Bartley et al. | 235/380 |
| 6,714,977 B1 | 3/2004 | Fowler et al. | 709/224 |
| 6,738,811 B1 | 5/2004 | Liang | 709/224 |
| 6,748,296 B1 | 6/2004 | Banerjee et al. | 700/241 |
| 6,772,048 B1 | 8/2004 | Leibu et al. | 700/241 |
| 6,837,436 B1 | 1/2005 | Swartz et al. | 235/472.02 |
| 6,867,685 B1 | 3/2005 | Stillwagon | 340/5.64 |
| 6,900,720 B1 | 5/2005 | Denison et al. | 340/5.9 |
| 2001/0002210 A1 | 5/2001 | Petite | 379/155 |
| 2002/0024420 A1 | 2/2002 | Ayala et al. | 340/5.61 |
| 2002/0169539 A1 | 11/2002 | Menard et al. | 701/200 |
| 2003/0003865 A1 | 1/2003 | Defosse et al. | 455/41 |
| 2003/0009313 A1 | 1/2003 | May et al. | 702/188 |
| 2003/0013482 A1 | 1/2003 | Brankovic | 455/553 |
| 2003/0128101 A1 | 7/2003 | Long | 340/5.26 |
| 2004/0207509 A1 | 10/2004 | Mlynarczyk et al. | 340/5.23 |
| 2005/0161953 A1 | 7/2005 | Roatis et al. | 292/199 |
| 2005/0179544 A1 | 8/2005 | Sutton et al. | 340/543 |

FOREIGN PATENT DOCUMENTS

| | | |
|---|---|---|
| EP | 0 564 736 A1 | 10/1993 |
| EP | 0 602 787 A2 | 10/1993 |
| EP | 0 817 138 A1 | 1/1998 |
| EP | 0 999 529 | 5/2000 |
| EP | 1096408 | 5/2001 |
| FR | 2 755776 | 5/1998 |
| JP | 6296335 A2 | 10/1994 |
| JP | 9198172 A2 | 7/1997 |
| JP | 10105802 | 4/1998 |
| JP | 04253294 | 9/2002 |
| WO | WO 89/07807 | 8/1989 |
| WO | WO 95/04333 | 2/1995 |

| | | |
|---|---|---|
| WO | WO 95/05609 | 2/1995 |
| WO | WO 97/09667 | 3/1997 |
| WO | WO 99/23620 | 11/1997 |
| WO | WO 98/45779 | 10/1998 |
| WO | WO 99/27465 | 6/1999 |
| WO | WO 99/36751 | 7/1999 |
| WO | WO 99/48065 | 9/1999 |
| WO | WO 00/04475 | 1/2000 |
| WO | WO 00/04476 | 1/2000 |
| WO | WO 00/31701 | 6/2000 |
| WO | 02/19281 | 3/2002 |

OTHER PUBLICATIONS

International Search Report for PCT/US99/05983, Mailed Aug. 13, 1999.

International Search Report PCT/US01/15522, Mailed May 16, 2002.

International Search Report PCT/US 01/31381, Mailed Nov. 7, 2002.

Pending U.S. Appl. No. 09/853,366, entitled *Method and System for the Optimal Formatting, Reduction and Compression of DEX/UCS Data* filed May 11, 2001 by Defosse et al.

Pending U.S. Appl. No. 09/862,891, entitled *System and Apparatus for the Remote Monitoring and Control of a Computing Component*-filed May 22,-2001 by Erin M. Defosse.

NetBotz Internet Article, "Welcome to Netbotz" at internet <http:www.netbotz.com>, Printed May 10, 2000.

American Power Conversion Internet Article, "Lightning Advisor", at internet address <http://lightning.apcc.com>, Printed May 10, 2000.

American Products Internet Article, "Product Information", at internet, <http://www.apc.com> Printed May 10, 2000.

PCT Search Report PCT/US01/16749, Mailed Dec. 20, 2001.

PCT Search Report PCT/US 01/41640, Mailed Aug. 21, 2002.

International Search Report for PCT/US99/05983, Aug. 13, 1999.

"Meet the Smart Coke Machine," The Sacramento Bee Business Technology, Aug. 30, 1995.

Skywire Provides Details of Wireless 'VendView' System; Vending Times, Sep., 1994.

Skywire allows vendor tracking of pop stock and sales details; RCR, vol. 14, No. 17, Sep. 4, 1995.

Left high and dry? Sold-out machine sends for Cokes; Nashville Banner, Aug. 16, 1995.

Leitch, Carolyn, "Coke Machine Signal when it's Time for a Refill", The Globe & Mail, Toranto, Ontario, Aug. 30, 1995.

Wireless Communications Forum, CTIA, vol. III, No. 1, Apr. 1995.

International Preliminary Examination Report PCT/US01/ 31381, Mailed May 12, 2003.

Antronics Ltd Case Study—BT redcare Telemetry Vending Interface Unit (pp. 1-4).

* cited by examiner

SYSTEM AND METHOD FOR MONITORING AND CONTROL OF BEVERAGE DISPENSING EQUIPMENT

CROSS REFERENCE TO RELATED APPLICATIONS

This application claims priority to U.S. Provisional Patent Application Ser. No. 60/224,097 filed Aug. 9, 2000 and entitled "System and Method for Monitoring and Control of Beverage Dispensing Equipment"; and This application is a continuation-in-part of U.S. patent application Ser. No. 09/267,254 filed Mar. 12, 1999 entitled "Remote Data Acquisition and Transmission System" which claims priority to U.S. Provisional Patent Application Ser. No. 60/078,645, filed Mar. 19, 1998, and entitled "Remote Data Acquisition and Transmission System for the Monitoring and Control of Vending Machines" and U.S. Provisional Patent Application Ser. No. 60/099,434, filed Sep. 8, 1998, and entitled "Remote Data Acquisition and Transmission System."

TECHNICAL FIELD OF THE INVENTION

The present invention relates generally to the field of remote data acquisition. More particularly, the present invention relates to a remote data acquisition and transmission system and method for the monitoring and control of beverage dispensing equipment.

BACKGROUND OF THE INVENTION

Over the past decade, beverage dispensing equipment manufacturers have developed new and innovative beverage dispensing equipment in response to market needs and beverage equipment operator demands. These innovations have been, for the most part, adopted by the beverage dispensing industry. This trend has generally been influenced by the accelerating rate of technological innovation in the electronic and electro-mechanical component industry. The availability of new technologies has given beverage dispensing equipment manufacturers the tools to address many of the requirements of beverage dispensing operators. Advances in electronics are now enabling the use of computer controlled mixing of fountain drinks in some beverage dispensing equipment. Some of the latest liquor dispensing devices now make it possible for operators to download sales, inventory, and machine health information on-site onto portable computers. Although these computerized systems make it easier for operators to gather and analyze data, they generally do not provide real time capabilities that are needed to make a major impact on the overall business of using, maintaining and monitoring beverage dispensing equipment.

SUMMARY OF THE INVENTION

In accordance with the present invention, a remote data acquisition and transmission system is disclosed that provides advantages over previously developed remote data acquisition systems. In one embodiment, the remote data acquisition and transmission system may be used for monitoring and control of beverage dispensing equipment. The remote data acquisition and transmission system preferably allows beverage dispensing equipment operators to gather data from the field without having to manually retrieve the data from the beverage dispensing equipment and to transmit data to the field such as price changes without having to visit each beverage dispensing device. This ability generally leads directly to improved sales, lower operational costs and better equipment performance by enhancing a manager's ability to direct operations and react quickly in order to correct problems.

According to one aspect of the present invention, the system preferably includes one or more application controllers and an application host. The application controller or controllers are preferably interfaced with remote beverage dispensing equipment from which operation data may be acquired and information transmitted thereto by each application controller. Each application controller may communicate with an application host via a local area network, and the application host may communicate with a network operations center preferably using a wide area network interface. The system may include a local area network (LAN) with one unit and its associated application host or multiple units and associated application hosts.

According to another aspect of the present invention, a remote data acquisition and transmission system is provided for beverage dispensing equipment. This system preferably includes a plurality of application controllers. Each application controller preferably interfaces, via a serial interface, to a beverage dispensing controller, with a beverage dispensing device from which operation data may be acquired by the application controller. The system may also include an application host that communicates with the application controllers via a local area network. The application host preferably includes a wide area network interface for communicating with a network operations center. The network operations center preferably communicates with the application host via a wide area network to receive the operation data acquired by the application controllers and to manage outgoing messages and/or data. Further, the application controllers and the application host may operate to autoconfigure the local area network upon initialization, and the application controllers may operate as relays when necessary to establish communication between the application host and other application controllers. In addition, the network operation center may maintain a database storing the operation data and providing secure third party access to the database.

According to a further aspect of the present invention, a method is provided for remote data acquisition and transmission. The method preferably includes interfacing a plurality of application controllers with remote beverage dispensing equipment from which operation data may be acquired by the application controllers. The method preferably further includes communicating between an application host and the application controllers via a local area network, and communicating between the application host and a network operations center using a wide area network interface.

In another aspect of the present invention, remote data acquisition and transmission system for beverage dispensing equipment is provided. The system preferably includes an application controller and an application host operably coupled to the application controller. In addition, the application controller is preferably coupled to and preferably interfaces with remote beverage dispensing equipment from which operating data may be acquired by the application controller. A wide area network interface for communicating with a network operations center is preferably included on the application host in such an aspect.

Technical advantages of the present invention may include the use of local wire-line and/or local-area wireless transmissions to implement a local area network (LAN) between multiple beverage dispensing devices. This provides a remote data acquisition system for beverage dispensing equipment that overcomes the limitations of current beverage dispensing systems by establishing a low-cost LAN that can then communicate externally using a long-range wireless or wire-line communication system. For example, a narrowband PCS wireless link (e.g., wireless two-way paging network) can be used between a remote beverage dispensing equipment LAN and a network operations center to establish an efficient and low-cost wide area network (WAN) which connects remote LANs together to form a larger network. The present invention provides systems and methods to manage devices that collect data from distributed corporate assets such as beverage dispensing equipment. The systems and methods preferably further collect desired data from such devices, store and/or archives such data and allows generation of selected reports to optimize performance of the corporate assets.

Additional technical advantages should be readily apparent from the drawings and description.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE INVENTION

The preferred embodiment of the present invention and its advantages are best understood by referring to FIGS. 1 through 9 of the drawings, like numerals being used for like and corresponding parts of the various drawings.

Figure 1:
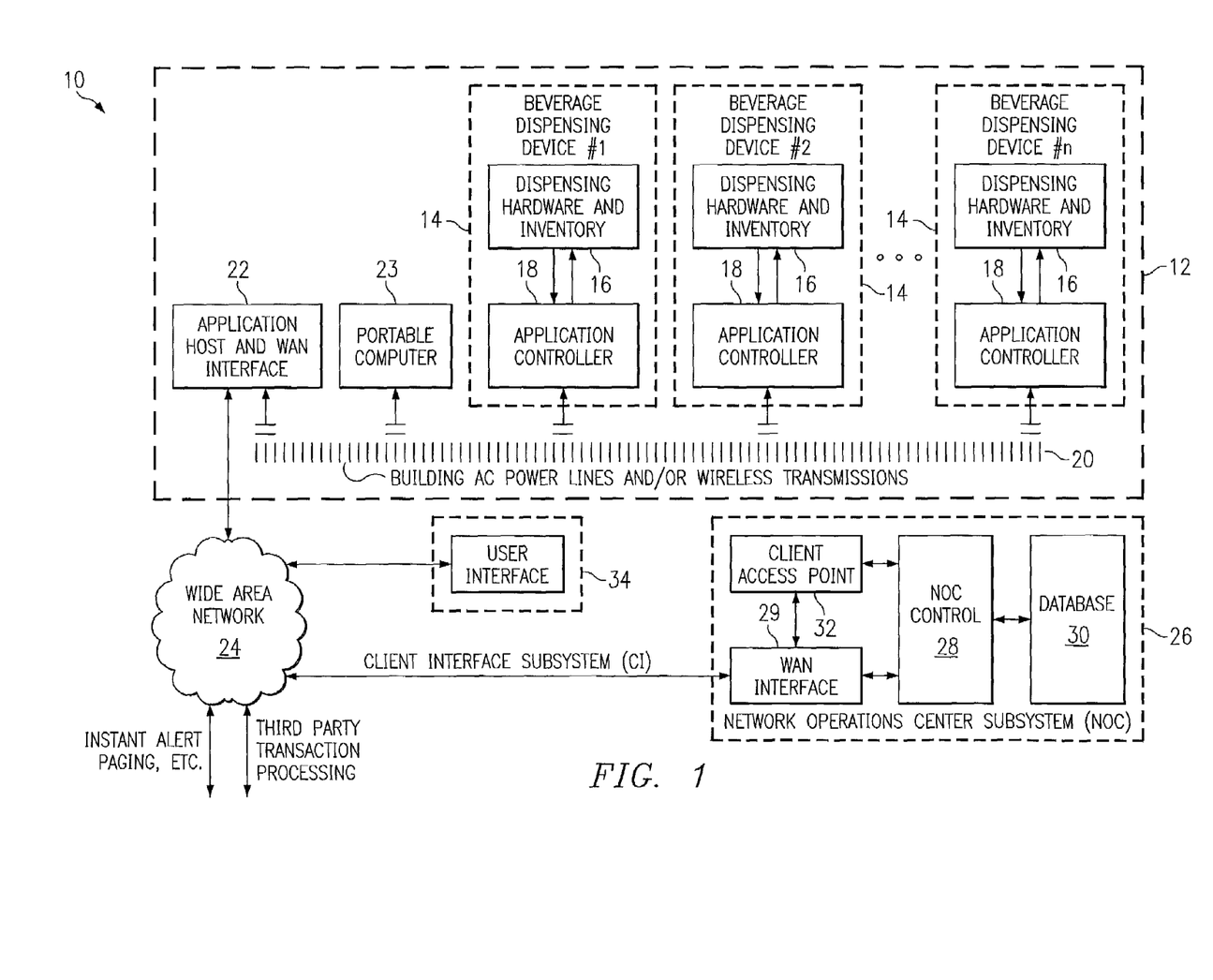
FIG. 1 is a functional block diagram of one embodiment of a remote data acquisition system for beverage dispensing equipment according to the present invention.

FIG. 1 is a functional block diagram of one embodiment of a remote data acquisition system for beverage dispensing equipment, indicated generally at 10, according to the present invention. In general, system 10 of FIG. 1 may communicate information from a beverage dispensing site 12 externally over a wide area wireless or wire-line network as well as internally over a local area wireless or wire-line network. As shown, the local area network at beverage dispensing site 12 can be referred to as a dispenser interrogation LAN subsystem (IL). Beverage dispensing site 12 may include only one beverage dispensing device 14 or a plurality of beverage dispensing devices 14. Each beverage dispensing device 14 may include beverage dispensing hardware such as fountains, ice makers, refrigerators, etc. and inventory 16 such as syrup and $CO_2$ for performing beverage dispensing functions and electronically tracking beverage dispensing information. Beverage dispensing device 14 may provide various types of products to customers such as soft drinks, mixed drinks, frozen drinks, soft-serve ice cream, etc.

According to the present invention, each beverage dispensing device 14 may include an application controller 18 coupled to and interfacing with beverage dispensing hardware and inventory 16. Many beverage dispensing devices 14 are equipped with electronics for controlling beverage dispensing operations as well as tracking some beverage dispensing events such as money received, change given and quantity of dispenses from each selection. Application controllers 18 may communicate with such embedded electronics as well as be equipped to directly sense other beverage dispensing events and beverage dispensing equipment parameters (e.g. compressor performance, carbon dioxide level, mixture ratios, temperature of dispenses, etc.). Such monitoring of beverage dispensing equipment enables the present invention to manage syrup and other beverage ingredients, mechanical problems with the beverage dispensing equipment, etc. in an attempt to ensure product and/or equipment availability. Application controllers 18 may also communicate with one another and the application host 22 preferably via onboard wire-line interfaces or wireless transceivers using wire-line or wireless transmissions respectively.

The term "wire-line transmissions" may be used to refer to all types of electromagnetic communications over wires, cables, or other types of conduits. Examples of such conduits include, but are not limited to, metal wires and cables made of copper or aluminum, fiber-optic lines, and cables constructed of other metals or composite materials satisfactory for carrying electromagnetic signals. Wire-line transmissions may be conducted in accordance with teachings of the present invention over electrical power lines, electrical power distribution systems, building electrical wiring, conventional telephone lines, T-1 lines, T-3 lines, ISDN lines, ADSL, etc.

The term "wireless transmissions" may be used to refer to all types of electromagnetic communications which do not require a wire, cable, or other types of conduits. Examples of wireless transmissions for use in local area networks (LAN) include, but are not limited to, radio frequencies, especially the 900 MHZ and 2.4 GHz bands, infra-red, and laser. Examples of wireless transmissions for use in wide area networks (WAN) include, but are not limited to, narrowband personal communications services (PCS), broadband PCS, circuit switched cellular, and cellular digital packet data (CDPD),and wide area wireless data, etc.

Together, application controllers 18 and application host 22 form a LAN that may be supported by wire-line and/or wireless transmissions 20. In addition, application controllers 18 may also act as repeaters in situations where application host 22 cannot directly communicate with a particular application controller 18 while another application controller 18, which does have an established communication link with application host 22, may directly communicate.

Application host 22 preferably acquires data captured by application controllers 18 and can package and communicate that data across an external network 24 using a wide area network (WAN) interface. Application host 22 may be installed together with application controller 18 inside a beverage dispensing device 14 or housed separately in another location. In the event that the application host 22 is placed inside a beverage dispensing device 14 together with an application controller 18, it may be possible to share some of the electronic components between them, the LAN transceiver for example, in order to reduce the cost of the hardware. In such an embodiment, the application host 22 and application controller 18 inside the same beverage dispensing device 14, may communicate with each other over a hardwired interface between the two components. Alternatively, the application host 22 and application controller 18 may be designed to be a single integrated component within a beverage dispensing device 14. Furthermore, an application host 22 may be used whose function may include monitoring the application controllers 18. For example, such an application host 22 could take the form of a hand-held portable computer 23 to be carried by service or delivery personnel in order to query the application controllers 18 without having to interact via the WAN interface.

The WAN interface 22 may be implemented in one of a number of ways. In particular, WAN interface 22 may be designed to support a wide area network 24 that can be implemented via wire-line or wireless transmissions. If a wireless narrowband PCS paging network is used to implement the WAN, messages from application host 22 may be communicated as digital messages through the pager network and stored in one or more dedicated message mailboxes provided by the wireless network operator. These mailboxes may be securely accessed, for example, through an Internet-based connection.

As shown in FIG. 1, a network operations center (NOC) 26 preferably communicates with one or more beverage dispensing sites 12 across wide area network 24. As mentioned, in one implementation, network operations center 26 may access mailboxes that store messages transmitted by application hosts 22 at beverage dispensing sites 12. NOC 26 may be integrated into a call center associated with a company operating beverage dispensing sites 12 or a company responsible for maintaining and servicing beverage dispensing sites 12.

In the embodiment of FIG. 1, network operations center 26 preferably includes a NOC control 28 that communicates with wide area network 24 through a WAN interface 29. NOC control 28 may receive data acquired from and transmit data to beverage dispensing sites 12, process the data and store the data in a database 30. NOC control 28 may generate one or more reports using the data. NOC control 28 may also perform instant alert paging, direct dial alarms and other functions to provide real time notification to beverage dispensing equipment operators upon the occurrence of certain events (e.g., out-of-stock, power outage, mix ratio violation, compressor failure, etc.). A reduction in the cost of service for beverage dispensing equipment in the field may be realized through the present invention's ability to notify service personnel of a beverage dispensing device problem as well as through the present invention's ability to remotely diagnose and provide the possible problem with a beverage dispensing device preferably prior to the dispatching and/or notification of any such service personnel. NOC control 28 can also provide third party transaction processing such as allowing queries on database 30. The WAN interface 29 between NOC control 28 and the wide area network 24 may be implemented through the use of either wire-line or wireless transmissions.

At network operations center 26, a client access point 32 preferably provides access from a client interface subsystem (CI) 34 across external network 24. In one implementation, client access point 32 may be implemented as a web-based interface allowing user access from a client computer across a network such as the Internet. Other implementations may include providing a direct-dial connection between client interface subsystem 34 and client access point 32. Once connected, a user may use client interface subsystem 34 to obtain information from database 30 based upon data acquired from beverage dispensing sites 12. Further, users may be provided with extended services such as trend information developed by mining and analyzing database 30.

According to the present invention, system 10 of FIG. 1 preferably combines a number of technologies to provide technical advantages in the area of beverage dispensing equipment management and to overcome perceived problems that may occur with remote data acquisition systems for beverage dispensing equipment. As mentioned above, some conventional remote data acquisition systems employ a point-to-point wireless communication link to retrieve information from and send information to a plurality of remote devices. Further, wide-area networks (WAN) may often be formed from a plurality of local area networks (LANs), and such LANs are preferably interconnected using a wire-line or wireless data transmission system. In other technical areas, wire-line and wireless transceivers have been used for local area network communication. For example, power line networks may be used in a variety of applications such as in the implementation of "smart building" functions, including the systems disclosed in U.S. Pat. Nos. 3,976,264 and 4,763,104. Yet wire-line and wireless LAN communications have generally not been implemented for purposes of data acquisition or beverage dispensing equipment management. In particular, conventional beverage dispensing equipment management systems that use wire-line and/or wireless transceivers for local interconnection of data acquisition and control devices as does system 10 of FIG. 1 are not known.

Figure 2:
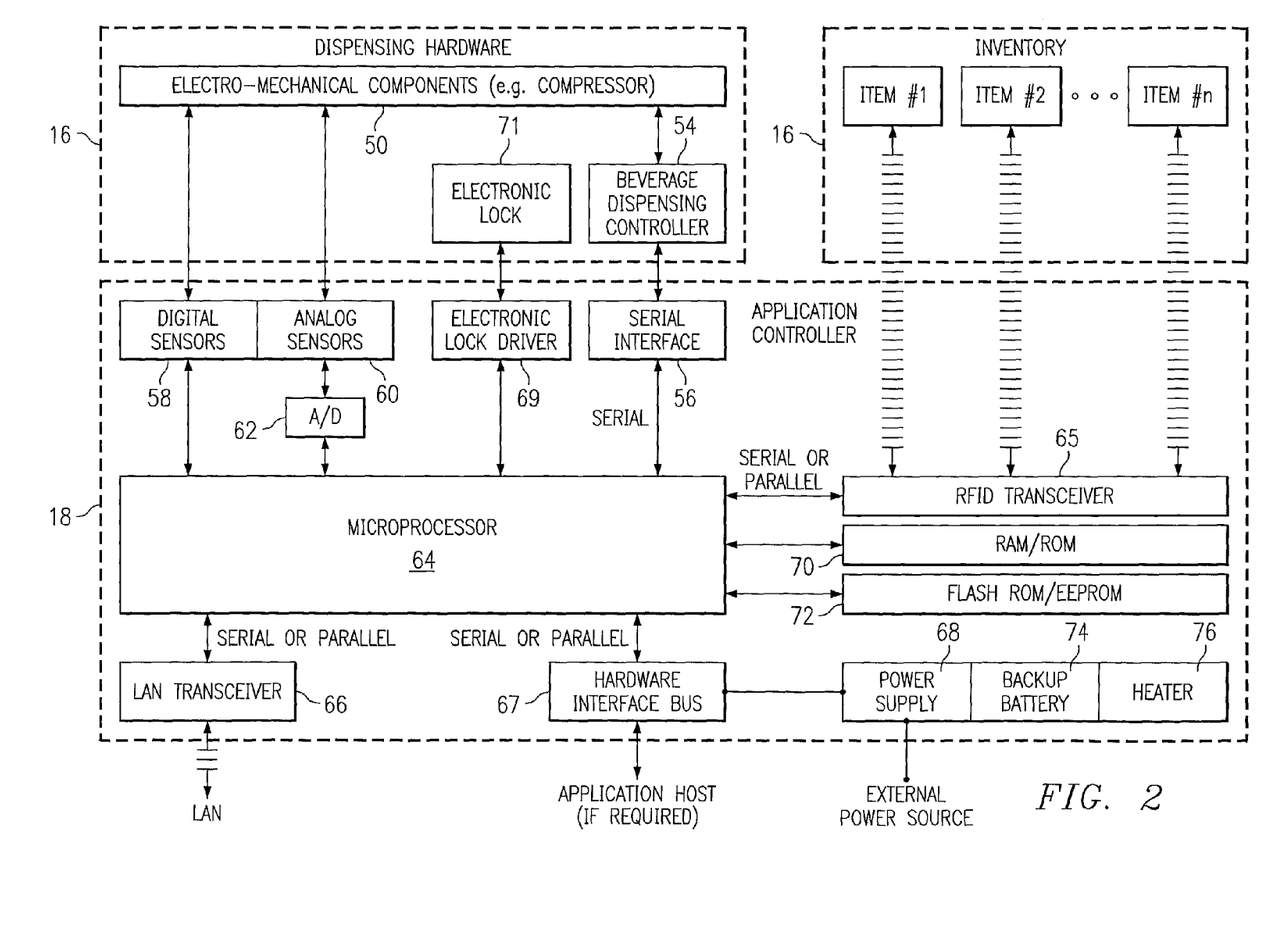
FIG. 2 is a functional block diagram of one embodiment of an application controller and its interface with dispensing hardware according to the present invention.

FIG. 2 is a functional block diagram of one embodiment of the interface between application controller 18 and beverage dispensing hardware and inventory 16 according to the present invention. In general, application controller 18 preferably interfaces with the internal systems of beverage dispensing device 14 to perform data acquisition and control functions as well as to provide a wire-line and/or wireless data communication transceiver for establishing a communication link with application host 22 (FIG. 1). As shown, beverage dispensing hardware 16 may include electro-mechanical components 50, some of which may be coupled to and interface with a beverage dispensing controller (BDC) 54.

Figure 5:
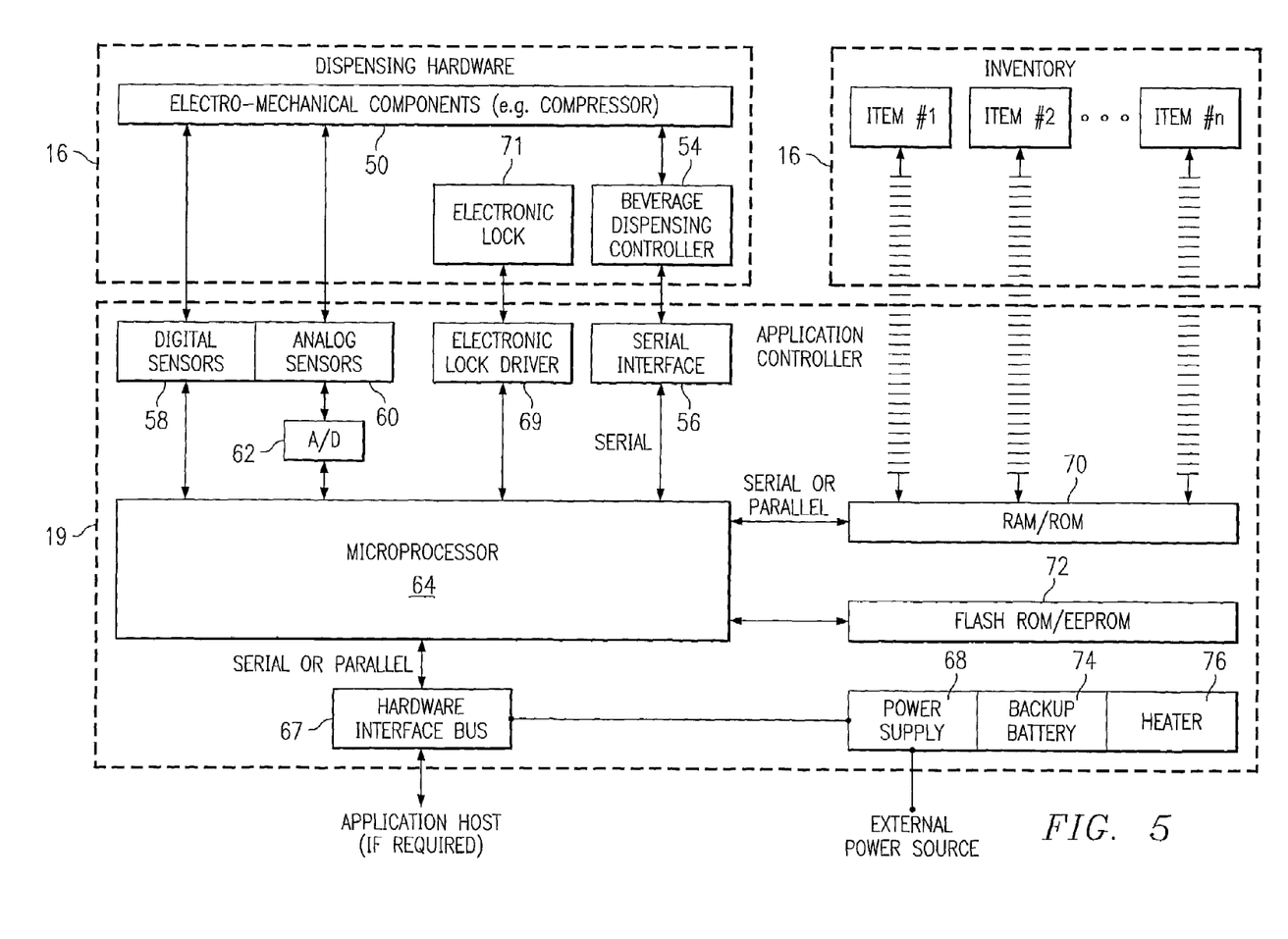
FIG. 5 is a functional block diagram of an additional embodiment of an application controller and its interface with dispensing hardware according to the present invention.

Application controller 18 preferably interfaces with beverage dispensing hardware 16. As shown, this interface may include a serial interface 56 (e.g., Multi-Drop Bus or DEX Port) that communicates with BMC 54 using a standard data protocol (e.g. DEX/UCS) implemented by many conventional vending machines. The interface may also include direct sensing of components 50 using digital sensors 58 and analog sensors 60. Analog sensors 60 may be coupled to analog-to-digital (A/D) converters 62 to convert analog measurements to digital signals. A central microprocessor or microcontroller 64 may be coupled to and interface with serial interface 56, digital sensors 58 and A/D converters 62 to acquire data relating to the operation of beverage dispensing hardware 16. Application controller 18 may also include RFID transceiver device 65 which is preferably operable to directly scan inventory 16 to obtain inventory readings. For example, RFID 65 may generate a radio signal that to be received by passive transponders attached to inventory items. These transponders can then reply with unique product identifiers and inventory status data to the application controller 18 such that inventory levels may be determined for each product. Inventory levels may be obtained without the use of RFID 65. For example FIG. 5 shows the direct communication of inventory and status information via serial, analog, or digital communication.

Microprocessor 64 is preferably operable to communicate inventory, event and other data using a wire-line or wireless LAN transceiver 66 that sends the data via wire-line or wireless transmissions respectively. As discussed above, microprocessor 64 may transmit/receive data to/from an application host located at beverage dispensing site 12 or to/from a hand-held portable computer acting as an application host. Microprocessor 64 may also communicate with an electronic lock driver 69 which is preferably operable to interface with an electronic lock 71. In the event that an application controller is collocated with an application host within a beverage dispensing device 14, then the two may communicate using a hardware interface bus 67 which allows the two devices to share electronic components, for example, the LAN transceiver 66.

Further, as shown, application controller 18 may include various types of memory units such as random access and read-only memory (RAM/ROM) 70, FLASH memory and/or Electrically Erasable/Programmable read-only-memory (Flash memory/EEPROM) 72 for storing application code and beverage dispensing data. The Flash memory 72 may be remotely programmed using the LAN and/or the WAN in the event that its data becomes corrupted or requires upgrade. The present invention is not limited to any specific type of memory unit. Further, application controller 18 may include a power supply 68, a backup battery 74 as well as a heater 76 (if needed).

Figure 3:
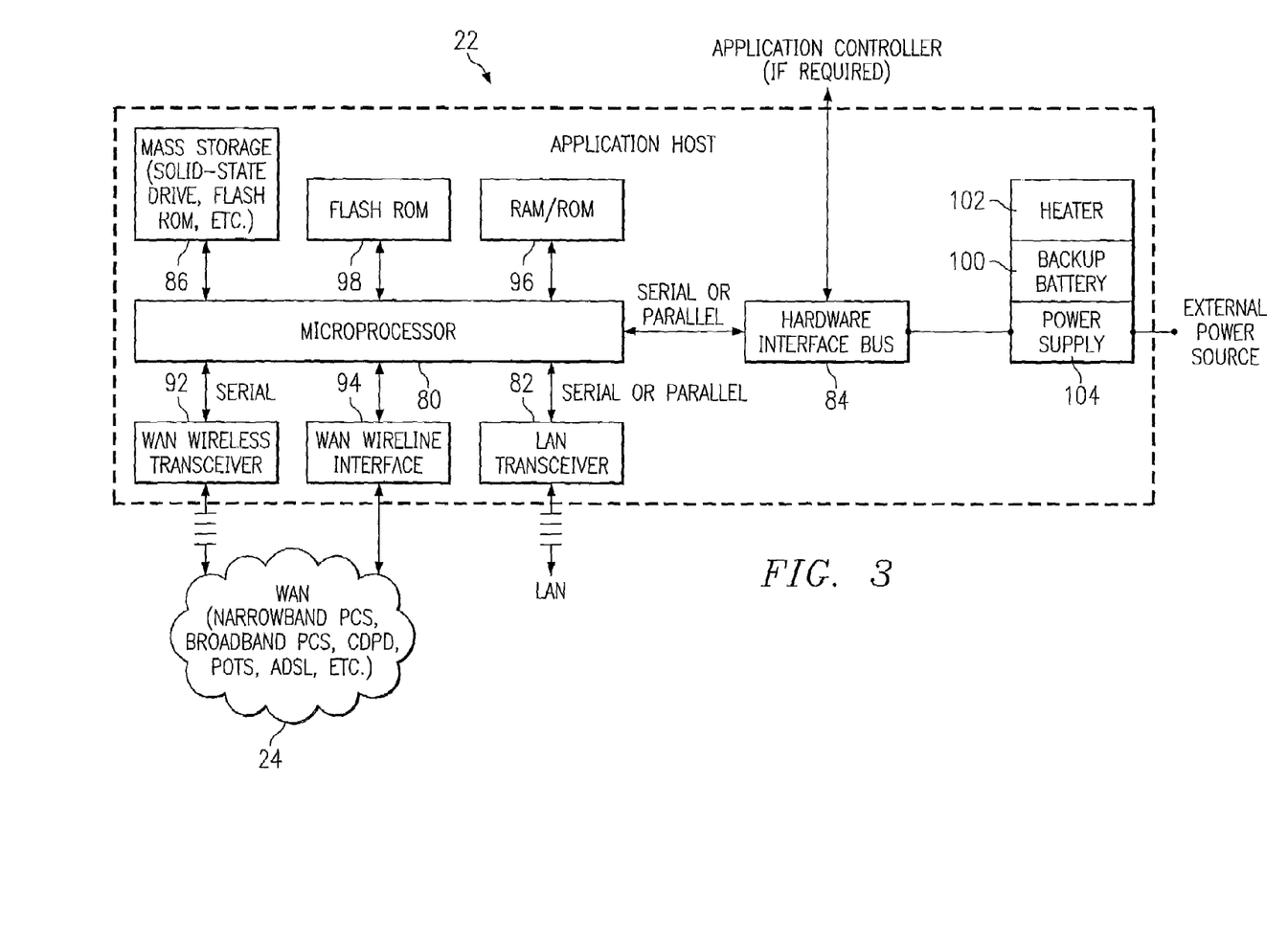
FIG. 3 is a functional block diagram of one embodiment of an application host according to the present invention.

FIG. 3 is a functional block diagram of one embodiment of application host 22 according to the present invention. In general, application host 22 is preferably operable to communicate with application controllers 18 and to communicate externally to establish a link with a remote computer, thus enabling the formation of the WAN. In the embodiment of FIG. 3, application host 22 preferably includes a microprocessor 80 operable to communicate with application controllers 18 using a LAN transceiver 82. This communication, for example, may involve wire-line and/or wireless transmissions depending upon the operating characteristics of LAN transceiver 82. Application host 22 may also communicate with an application controller 18 using a hardware interface bus 84. For example, this connection may be used in the case where application host 22 is collocated inside a beverage dispensing device 14 together with an application controller 18.

Microprocessor 80 is preferably operable to receive data captured by application controllers 18, process the data and store the data in a mass storage device 86 (e.g., hard drive, solid-state recorder, FLASH memory). Microprocessor 80 may then retrieve data from storage device 86 and communicate data externally using a WAN wireless transceiver 92 or WAN wire-line interface 94 communicating via wireless or wire-line transmissions respectively. In particular, wireless transceiver 92 may be used to implement a digital paging network based communication scheme across a narrowband PCS network as mentioned above or a wide area wireless network. Application host 22 may also include random access and read-only memory (RAM/ROM) 96 and/or FLASH memory 98 for storing application code and beverage dispensing data. Flash memory 72 may be remotely programmed using a WAN in the event that its data becomes corrupted or requires upgrade. The present invention is not limited to any specific type of memory unit. Further, application host 22 may include a power supply 104, a back-up power source 100 (e.g., battery) as well as a heater 102 (if needed). Some of the components of application host 22 may be unnecessary if application host 22 and an application controller 18 are interfaced directly inside a beverage dispensing device 14.

Figure 4:
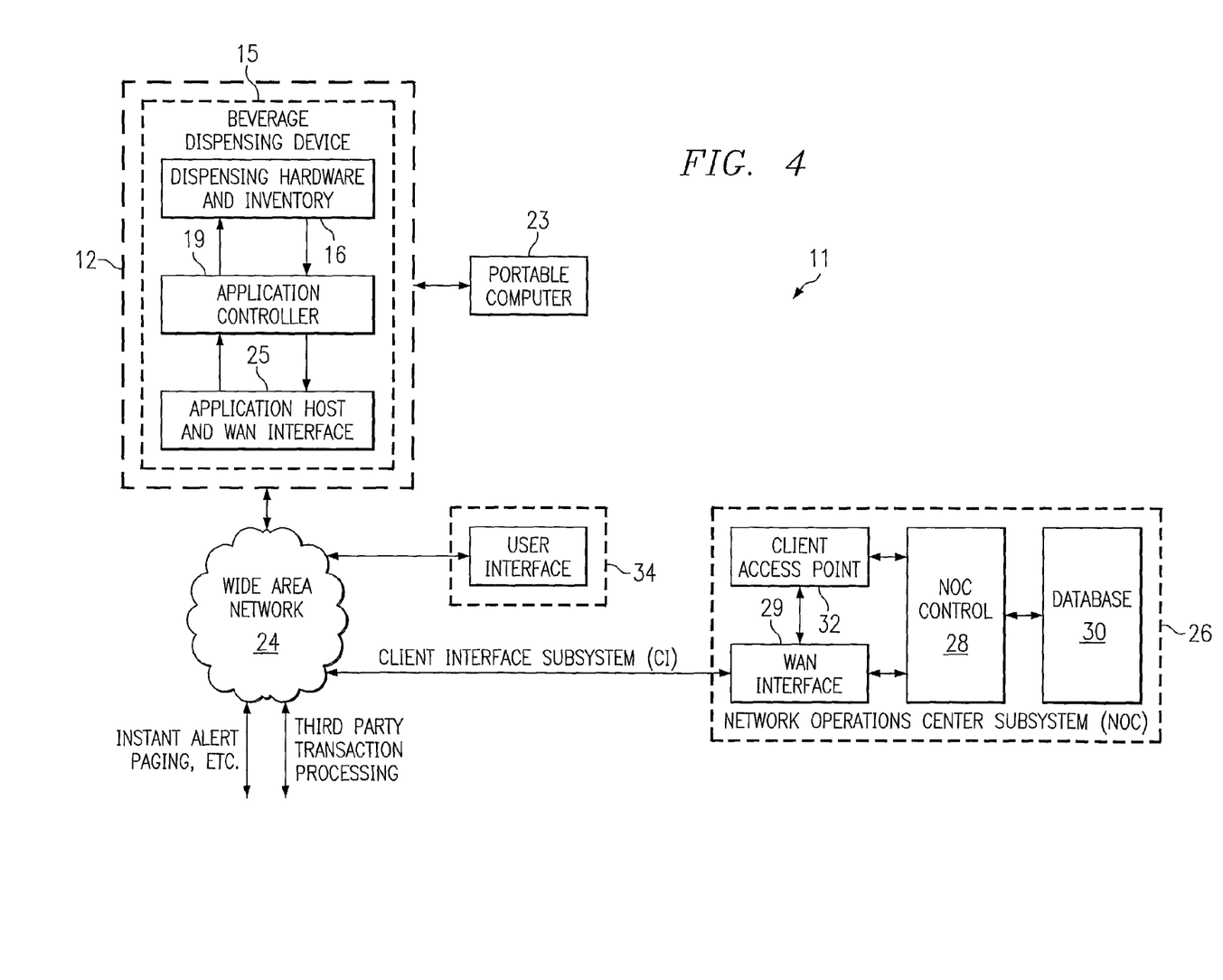
FIG. 4 is a functional block diagram of an additional embodiment of a remote data acquisition system for beverage dispensing equipment according to the present invention.

FIG. 4 is a functional block diagram of an additional embodiment of a remote data acquisition system for beverage dispensing equipment, indicated generally at 11, according to the present invention. In general, system 11 of FIG. 4 is a "point-to-point" beverage dispensing device 15 monitoring scheme that communicates information from a single beverage dispensing device 15 beverage dispensing site 12 externally over a wide area wireless or wire-line network. As shown, beverage dispensing site 12 includes only one beverage dispensing device 15. Similar to beverage dispensing device 14, beverage dispensing device 15 may include beverage dispensing hardware such as fountains, ice makers, refrigerators, etc. and inventory 16, such as syrup and $CO_2$, for performing beverage dispensing functions and electronically tracking beverage dispensing information. Beverage dispensing device 15 may provide various types of products to customers such as soft drinks, mixed drinks, frozen drinks, softserve ice cream, etc.

According to the present invention, beverage dispensing device 15 preferably includes an application controller 19, similar in form and function to application controller 18, coupled to and interfacing with beverage dispensing hardware and inventory 16. Many beverage dispensing devices 15 are equipped with electronics for controlling beverage dispensing operations as well as tracking some beverage dispensing events such as money received, change given and quantity of dispenses from each selection. As described above, application controllers 18 and/or 19 may communicate with such embedded electronics as well as be equipped to directly sense other beverage dispensing events and beverage dispensing equipment and inventory parameters (e.g. compressor performance, carbon dioxide level, mixture ratios, temperature of dispenses, pressure, weight and any other parameters used with beverage dispensing equipment). Such monitoring of beverage dispensing equipment enables the present invention to manage syrup and other beverage ingredients, mechanical problems with the beverage dispensing equipment, etc. in an attempt to ensure product and/or equipment availability from single or multiple beverage dispersing device dispensing sites 12.

An application host 25, similar in form and function to application host 22, is preferably installed together with application controller 19 inside beverage dispensing device 15. As mentioned above, in the event that an application host 25 is placed inside a beverage dispensing device 15 together with an application controller 19, it may be possible to share some of the electronic components between them to reduce the cost of the hardware. In such an embodiment, the application host 25 and application controller 19 inside the same beverage dispensing device 15, may communicate with each other over a hardwired interface between the two components, via wireless transceivers and transmissions, as well as via other communication schemes. Alternatively, application host 25 and application controller 19 may be designed to be a single integrated component within beverage dispensing device 15. Application host 25, similar to application host 22, preferably acquires data captured by application controller 19 and may package and communicate that data across an external network 24 using a wide area network (WAN) interface. Furthermore, an application host 25 may be used whose function may include monitoring the application controllers 19. For example, a hand-held portable computer 23 carried by service or delivery personnel may be employed to query the application controllers 19.

Similar to the discussion concerning WAN interface 22 above, WAN interface 25 may be implemented in one of a number of ways. In particular, WAN interface 25 may be designed to support a wide area network 24 that can be implemented via wire-line or wireless transmissions. If a wireless narrowband PCS paging network is used to implement the WAN, messages from application host 25 may be communicated as digital messages through the pager network and stored in one or more dedicated message mailboxes provided by the wireless network operator. These mailboxes may be securely accessed, for example, through an Internet-based connection.

As shown in FIG. 4, network operations center (NOC) 26 preferably communicates system 11 across wide area network 24. As mentioned, in one implementation, network operations center 26 may access mailboxes that store messages transmitted by application hosts 25 at beverage dispensing sites 12. NOC 26 may be integrated into a call center associated with a company operating beverage dispensing sites 12 or a company responsible for maintaining and servicing beverage dispensing sites 12.

In the embodiment of FIG. 4, network operations center 26 preferably includes a NOC control 28 that communicates with wide area network 24 through a WAN interface 29. NOC control 28 may receive data acquired from and transmit data to beverage dispensing site 12, process the data and store the data in a database 30. NOC control 28 may generate one or more reports using the data. NOC control 28 may also perform instant alert paging, direct dial alarms and other functions to provide real time notification to beverage dispensing equipment operators upon the occurrence of certain events (e.g., out-of-stock, power outage, mix ratio violation, compressor failure, etc.). A reduction in the cost of service for beverage dispensing equipment in the field may be realized through the present invention's ability to notify service personnel of a beverage dispensing device problem as well as through the present invention's ability to remotely diagnose and provide the possible problem with a beverage dispensing device preferably prior to the dispatching and/or notification of any such service personnel. Further, NOC control 28 may also perform many of the functions disclosed herein. The WAN interface 29 between NOC control 28 and the wide area network 24 may be implemented through the use of either wire-line or wireless transmissions.

Similar to FIG. 2, FIG. 5 is a functional block diagram of one additional embodiment of the interface between application controller 19 and beverage dispensing hardware and inventory 16 according to the present invention. In general, application controller 19 preferably interfaces with the internal systems of beverage dispensing device 15 to perform data acquisition and control functions as well as to provide a wire-line and/or wireless data communication transceiver for establishing a communication link with application host 25. As shown, beverage dispensing hardware 16 may include electro-mechanical components 50, some of which may be coupled to and interface with a beverage dispensing controller (BDC) 54.

Application controller 19 preferably interfaces with beverage dispensing hardware 16. As shown, this interface may include a serial interface 56 (e.g., Multi-Drop Bus or DEX Port) that communicates with BMC 54 using a standard data protocol (e.g. DEX/UCS) implemented by many conventional vending machines. The interface may also include direct sensing of components 50 using digital sensors 58 and analog sensors 60. Analog sensors 60 may be coupled to analog-to-digital (A/D) converters 62 to convert analog measurements to digital signals. A central microprocessor or microcontroller 64 may be coupled to and interface with serial interface 56, digital sensors 58 and A/D converters 62 to acquire data relating to the operation of beverage dispensing hardware 16.

Microprocessor 64 is preferably operable to communicate inventory, event and other data using a wire-line or wireless transceiver (not expressly shown) that sends the data via wire-line or wireless transmissions respectively. As discussed above, microprocessor 64 may transmit/receive data to/from an application host 25 as well as to/from a hand-held portable computer 23 acting as an application host 25. For some applications microprocessor 64 may also communicate with an electronic lock driver 69 which is preferably operable to interface with an electronic lock 71. For other applications an electronic lock and electronic lock driver may not be used with beverage dispensing equipment. In the event that an application controller 19 is collocated with an application host 25 within a beverage dispensing device 15, then the two may communicate using a hardware interface bus 67 which allows the two devices to share electronic components, for example, a transceiver.

Further, as mentioned above, application controller 19 may include various types of memory units such as random access and read-only memory (RAM/ROM) 70, FLASH memory and/or Electrically Erasable/Programmable read-only-memory (Flash memory/EEPROM) 72 for storing application code and beverage dispensing data. The Flash memory 72 may be remotely programmed using the LAN and/or the WAN in the event that its data becomes corrupted or requires upgrade. The present invention is not limited to any specific type of memory unit. Further, application controller 19 may include a power supply 68, a backup battery 74 as well as a heater 76 (if needed).

Figure 6:
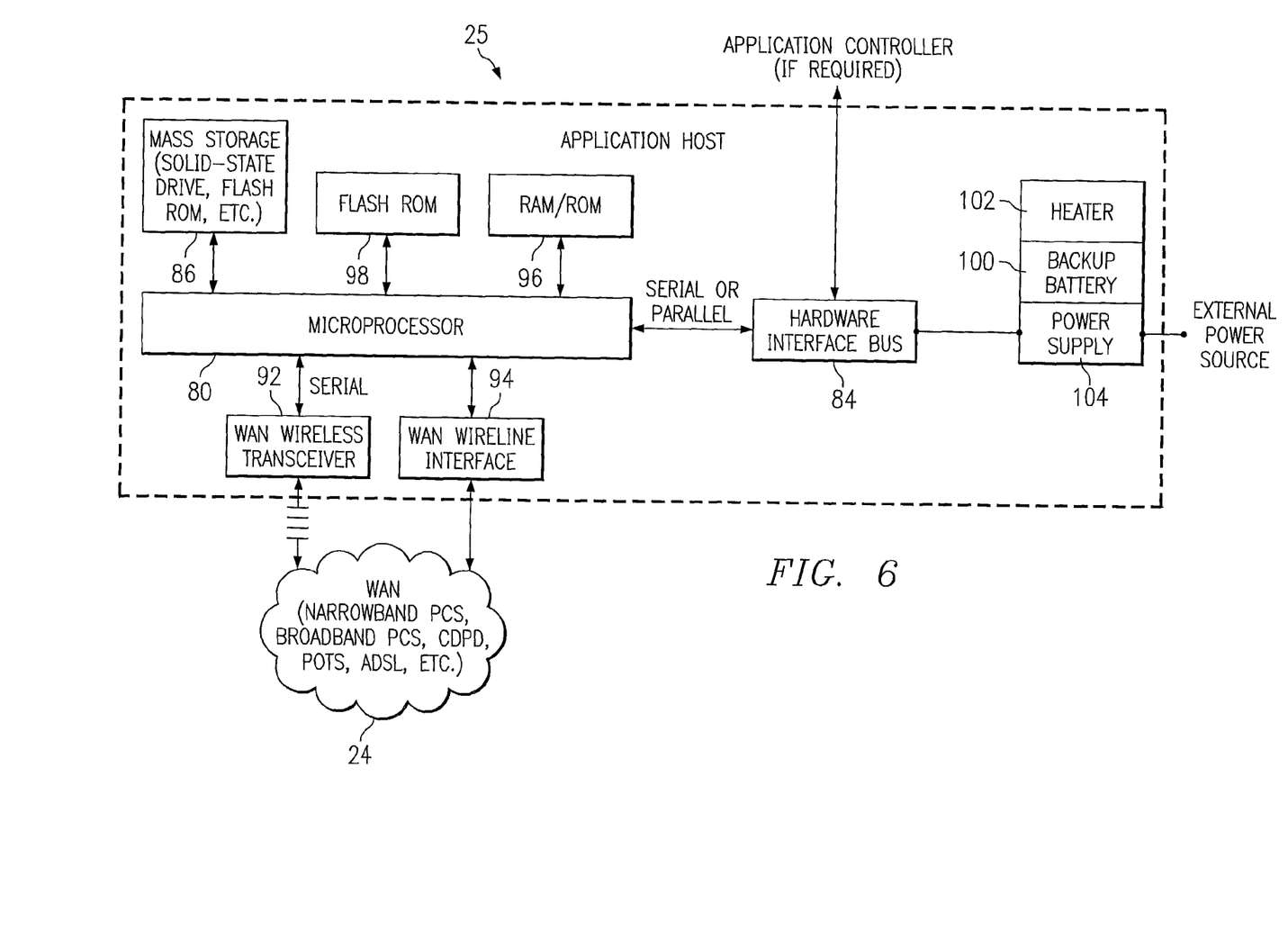
FIG. 6 is a functional block diagram of an additional embodiment of an application host according to the present invention.

FIG. 6 is a functional block diagram of one embodiment of application host 25 according to the present invention. In general, application host 25 is preferably operable to communicate with application controllers 19 and to communicate externally to establish a link with a remote computer, thus enabling the formation of point-to-point communication connection. In the embodiment of FIG. 6, application host 25 preferably includes a microprocessor 80 operable to communicate with application controller 19. This communication, for example, may involve wire-line and/or wireless transmissions. Application host 25 may also communicate with an application controller 19 using hardware interface bus 84. For example, this connection may be used in the case where application host 25 is collocated inside beverage dispensing device 15 together with application controller 19.

Microprocessor 80 is preferably operable to receive data captured by application controllers 19, process the data and store the data in a mass storage device 86 (e.g., hard drive, solid-state recorder, FLASH memory). Microprocessor 80 may then retrieve data from storage device 86 and communicate data externally using a WAN wireless transceiver 92 or WAN wire-line interface 94 communicating via wireless or wire-line transmissions respectively. In particular, wireless transceiver 92 may be used to implement a digital paging network based communication scheme across a narrowband PCS network as mentioned above. Application host 25 may also include random access and read-only memory (RAM/ROM) 96 and/or FLASH memory 98 for storing application code and beverage dispensing data. Flash memory 72 may be remotely programmed using a WAN in the event that its data becomes corrupted or requires upgrade. The present invention is not limited to any specific type of memory unit. Further, application host 25 may include a power supply 104, a back-up power source 100 (e.g., battery) as well as a heater 102 (if needed). Some of the components of application host 25 may be unnecessary if application host 25 and an application controller 19 are interfaced directly inside beverage dispensing device 15.

Figure 7:
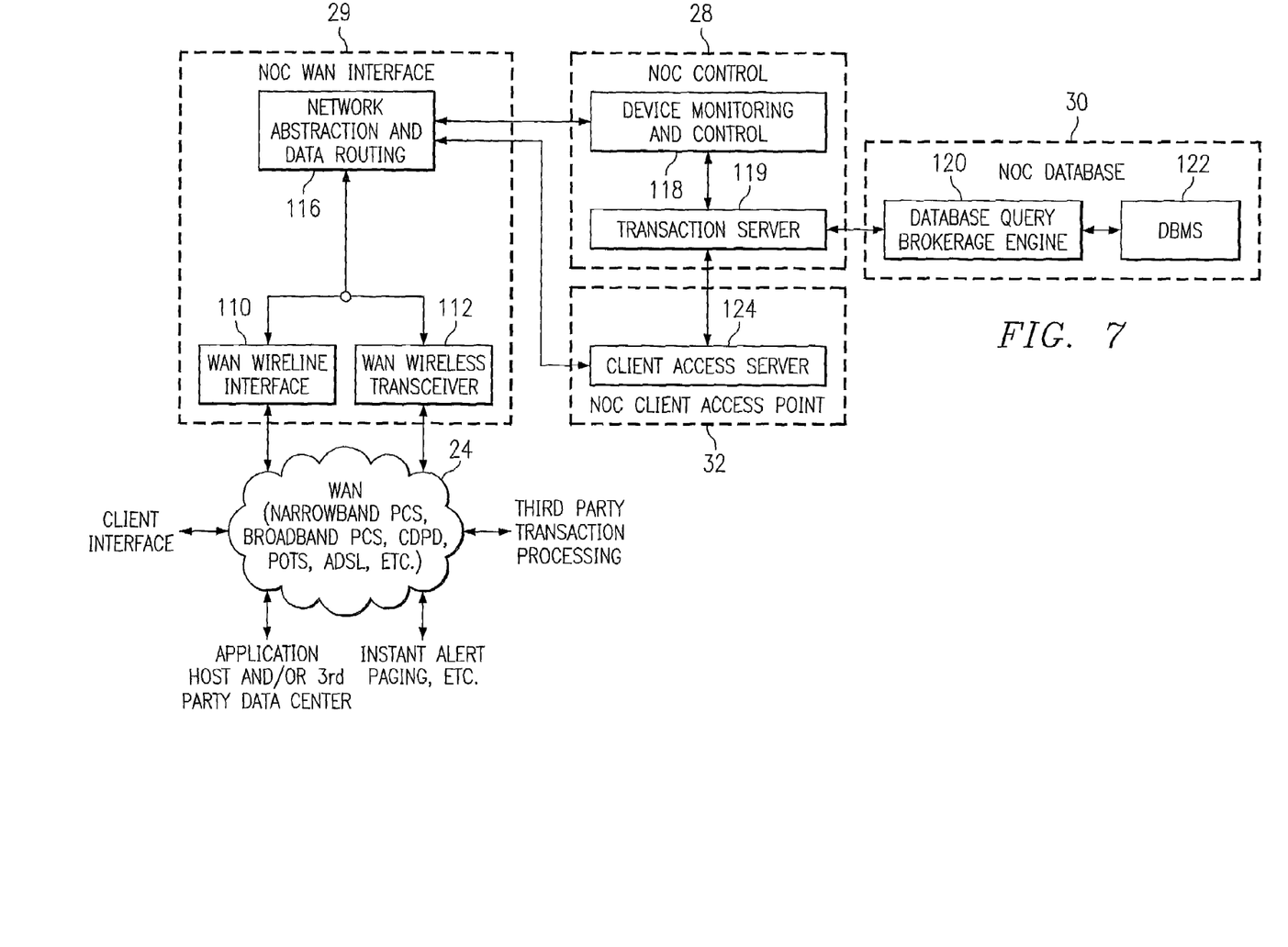
FIG. 7 is a functional block diagram of one embodiment of a network operations center according to the present invention.

FIG. 7 is a functional block diagram of one embodiment of network operations center 26 according to the present invention. As shown, network interface 29 may include various interface devices such as a WAN wire-line interface 110 or WAN wireless transceiver 112 communicating via wire-line or wireless transmissions respectively. These interface devices support connections to external network 24 and communicate internally with a network abstraction and data routing unit 116. Unit 116 is preferably operable to route data to NOC control 28 or client access point 32 as appropriate. NOC control 28 may include one or more device monitoring and control units 118 and transaction servers 119 that have access to a NOC database 30. Database 30 may include a database query brokerage engine 120 connected to a DBMS 122. Client access point 32 can include a client access server 124 that also has access to database 30 through transaction server 119. Transaction servers 119 may operate to receive data acquired from remote beverage dispensing devices 14, store and maintain data in database 30, and provide access to database 30. Client access point 32 may operate to support client access to network operations center 26 and database 30.

Figure 8:
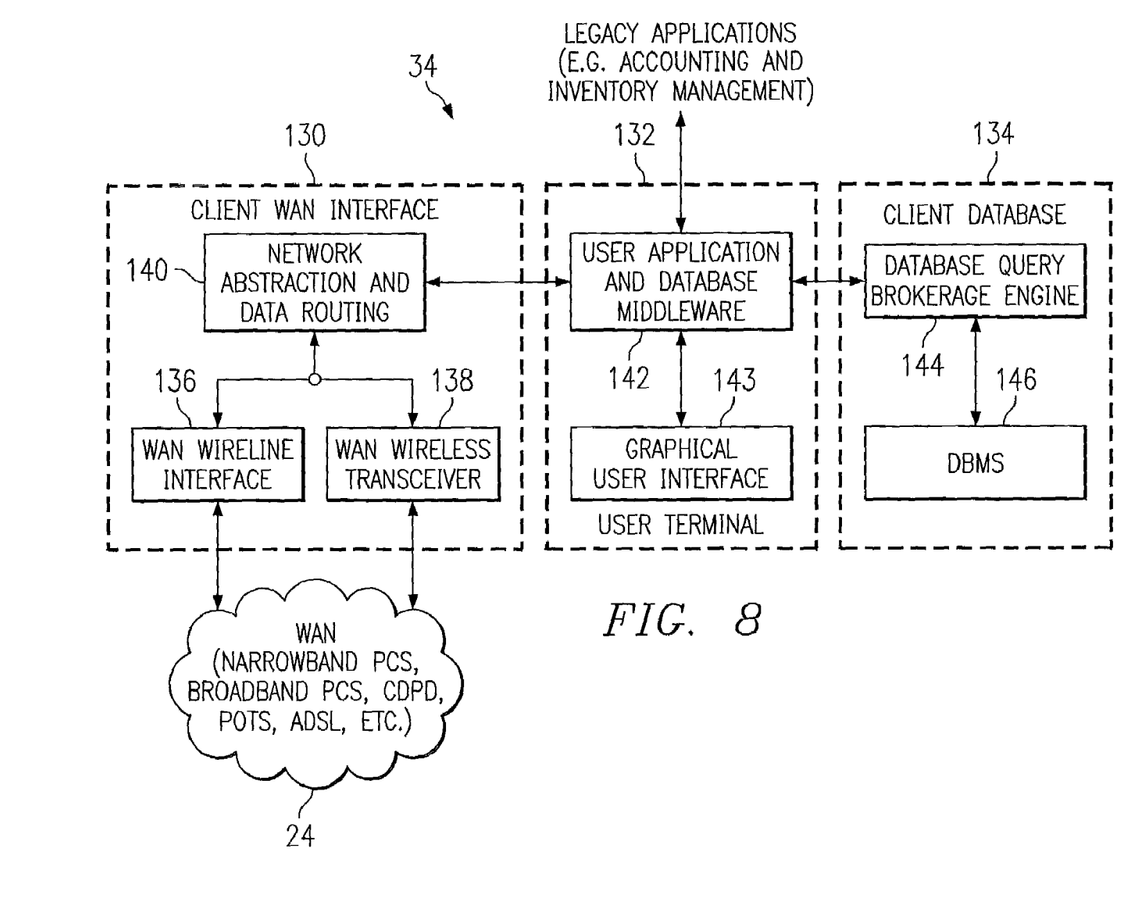
FIG. 8 is a functional block diagram of one embodiment of a client WAN interface according to the present invention.

FIG. 8 is a functional block diagram of one embodiment of the client interface 34 according to the present invention. As shown, client interface 34 preferably includes a WAN interface 130, a user terminal 132 and a database 134. WAN interface 130 may have a number of interface devices for supporting connections to the wide area network 24. These may include a WAN wire-line interface 136 or WAN wireless transceiver 138 communicating via wire-line or wireless transmissions respectively. Network interface 130 is preferably connected to user terminal computer 132 via a network abstraction and data routing unit 140. User terminal 132 may include a user applications and database middleware 142 and a graphical user interface 143. User terminal 132 may also be connected to database 134 which preferably includes a database query brokerage engine software 144 and a database management system (DBMS) 146.

User terminal 132 is preferably operable to provide a local user with a graphical user interface 143 to accomplish a connection to client access point 32 of network operations center 26. Database 134 may locally store information obtained from network operations center 26 regarding the user's beverage dispensing device operations. Further, user applications and database middleware 142 may allow communication with existing legacy applications that the user may have. Further, graphical user interface 143 may include a web browser-type interface. In this case, user terminal 132 may be a computer with a web browser and an Internet connection provided by the network interface 130.

Figure 9:
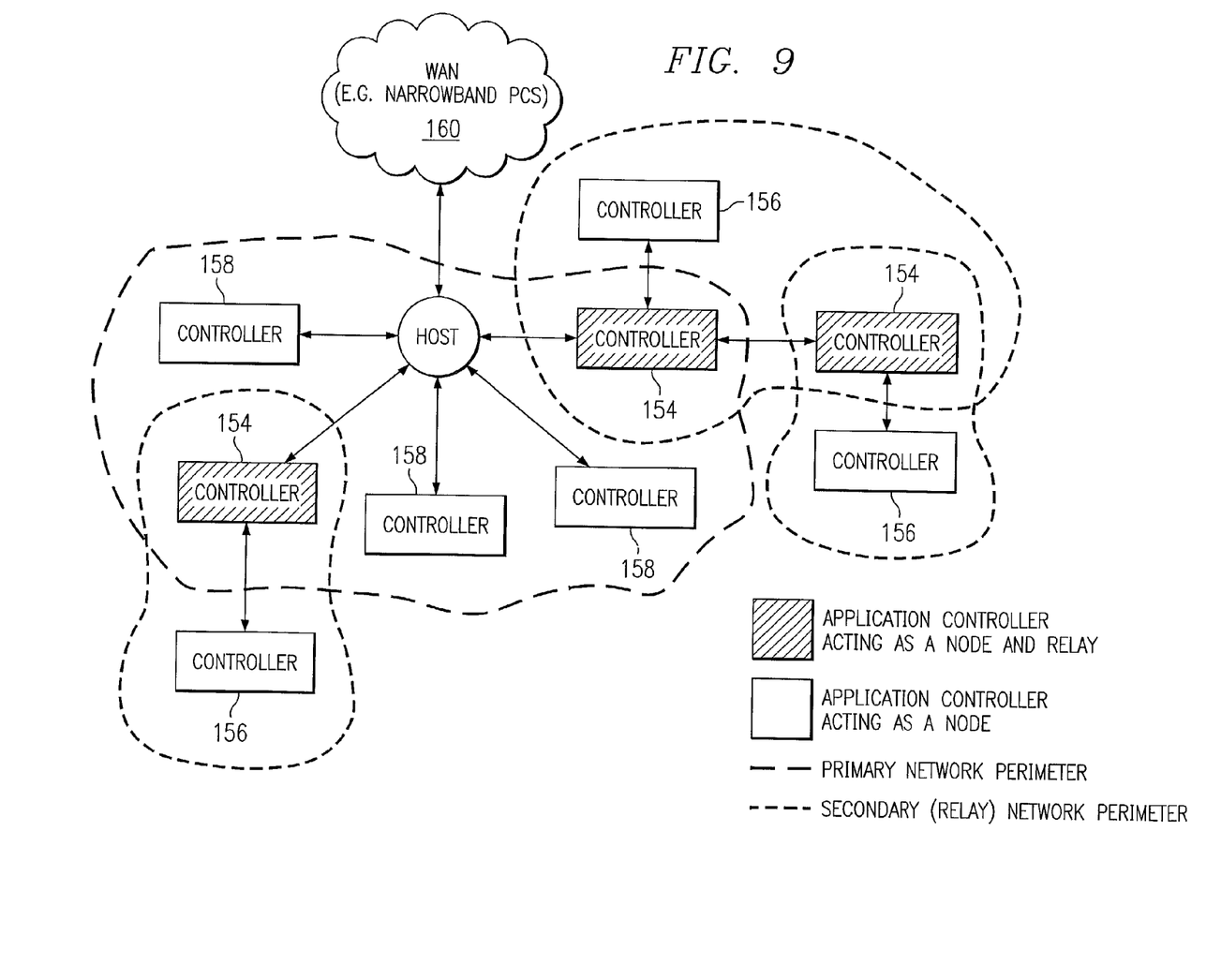
FIG. 9 is a functional block diagram of one embodiment of a wireless local area network implementation architecture according to the present invention.

FIG. 9 is a functional block diagram of one embodiment of a wireless local area network implementation architecture, indicated generally at 150, according to the present invention. In architecture 150, an application host 152 is preferably responsible for creating, maintaining and supervising a LAN on which application controllers 154, 156 and 158 reside. Application host 152 may also be responsible for transmitting and receiving information to and from WAN 160. In the illustrated embodiment, WAN 160 is preferably implemented using a two-way narrowband PCS network. It should be understood that other WAN technologies could also be used, including POTS, ADSL, ISDN, wideband PCS, circuit-switched cellular, CDPD, FrameRelay, etc. As shown in FIG. 9, application controllers 154, 156 and 158 may act as a network node or as a network node and a relay.

In FIG. 9, application host 152 operates to route queries directed to application controllers 152, 154 and 158 and stores beverage dispensing device 14 and/or 15 data transmitted by application controllers 154, 156 and 158 on the LAN. As in the case of application controllers 154, 156 and 158, application host 152 may exist on either a wire-line (e.g. power line, Ethernet, POTS, etc.) or wireless (e.g. RF or IR) LAN using the appropriate interface and/or transceiver. If application host 152 is incapable of communicating with a specific application controller 154, 156 and 158 because of attenuation and/or noise on the network, application host 152 may request another application controller 154, 156 and 158 to route the data to/from the application controller 154, 156 and 158 which is out of range.

Creation and maintenance of the network by application host 152 may be conducted in any number of ways. One such straightforward approach is discussed below. At activation, application host 152 may transmit a broadcast signal requesting all application controllers 154, 156 and 158 to respond. Application host 152 may then build a table of application controllers 154, 156 and 158 in communication range. Application host 152 may then send a broadcast message requesting that each application controller 154, 156 and 158 in turn transmit a broadcast message requesting a response from all other application controllers 154, 156 and 158 in their communication range such that each of the application controllers 154, 156, and 158 may create its own table. The information in these tables will preferably be transmitted to application host 152. Application host 152 may then compare its initial table with all the tables sent in by the individual application controllers 154, 156 and 158. Application host 152 may then identify any application controllers 154, 156 and 158 that are not within its own primary network perimeter (communication range) and may build a routing table for application controllers 154, 156 and 158 not in communication range. This routing information will then be transmitted to each application controller 154, 156 and 158 on a relay (routing) path. From then on, data being transmitted to an application controller 154, 156 and 158 outside of application host 152's primary network perimeter will contain appropriate routing information, and vice-versa. This type of network does not preclude the possibility of any single application controller 154, 156 and 158 being totally out of network coverage but does provide for a plug-and-play network creation process for those machines within primary and secondary network boundaries. Application controllers 154, 156 and 158 completely out of range may need to be moved to a more suitable location.

One example of multiple relay capabilities provided by the present invention is shown in FIG. 9. By establishing a remote data acquisition and transmission system incorporating teachings of the present invention, there is generally no architectural limit as to the number of relays that can be implemented between the application host and any particular application controller.

In architecture 150 of FIG. 9, application host 152 is preferably operable to store a copy of the firmware for application controllers 154, 156 and 158 in the event that the copy on an application controller 154, 156 and 158 becomes corrupted or needs to be updated for some reason. As with application controllers 154, 156 and 158, application host 152 may also contain special bootstrap firmware that will allow it to boot up and rewrite the contents of its own firmware. The bootstrap code will preferably signal that application host 152 requires new firmware, and the appropriate software may be sent to it over the WAN interface. This code may then be written to Flash memory 72 to allow application host 152 to perform the update.

In general, the present invention provides a remote data acquisition system for monitoring and control of beverage dispensing equipment that includes a computer controlled application host located at beverage dispensing sites 12. The host may include a wire-line interface or wireless transceiver through which a communication link with a remote computer can be established. The host may also include a wire-line interface and/or wireless transceiver through which the host can communicate with a plurality of beverage dispensing devices 14 and/or a single beverage dispensing device 15 at the beverage dispensing site 12. Each beverage dispensing device 14 and/or 15 may include a microprocessor controlled set of electronics that performs the actual data acquisition functions from the beverage dispensing device 14 and/or 15 and that interfaces with a wire-line interface or wireless communication transceiver for establishing a link to the beverage dispensing site host computer.

In the above embodiments, an application host preferably controls operations at each beverage dispensing site 12. In general, the application host can be implemented by software executing on a computer system that interfaces both to the beverage dispensing devices 14 and/or 15 on the LAN and/or the external network. In one embodiment, the software will preferably have a number of software modules or objects that perform the various functions of the application host. The application controllers may also be implemented by executing software which will have a number of software modules or objects that perform the various functions of the application controllers.

Although the present invention has been described in detail, it should be understood that various changes, substitutions and alterations can be made thereto without departing from the spirit and scope of the invention.

What is claimed is:

1. A remote data acquisition and transmission system for beverage dispensing equipment, comprising:
    first and second application controllers, the first application controller interfacing with a first beverage dispensing device to acquire operation data from the first beverage dispensing device, and the second application controller interfacing with a second beverage dispensing device to acquire operation data from the second beverage dispensing device;
    an application host communicating with at least one of the first and second application controllers via a local area network (LAN) to receive the operation data from the first and second beverage dispensing devices;
    a wide area network (WAN) interface in the application host for communicating with a network operations center;
    the first and second application controllers and the application host operable to autoconfigure the local area network;
    a first transceiver in the first application controller that transmits the operation data from the first beverage dispensing device to the second beverage dispensing device;
    a second transceiver in the second application controller that receives the operation data from the first beverage dispensing device and relays the operation data from the first beverage dispensing device to the application host on behalf of the first application controller, wherein the second transceiver also transmits the operation data from the second beverage dispensing device to the application host;
    the network operations center communicating with the application host via the WAN to receive the operation data acquired by the first and second application controllers; and
    the network operations center transmitting data for the first and second beverage dispensing devices via the WAN to the application host, the application host transmitting the data to at least one of the first and second application controllers via the LAN, and the first and second application controllers providing the data to the first and second beverage dispensing devices, respectively.

2. The system of claim 1, wherein:
    the LAN is supported by wireless transmissions;
    the application host and each of the first and second application controllers comprises a wireless LAN transceiver for communicating via the LAN; and
    the application host comprises a hand-held portable computer.

3. The system of claim 1, wherein:
    the local area network is supported by wire-line transmissions; and
    the application host and each application controller comprise a wire-line LAN transceiver for communicating via the local area network.

4. The system of claim 1 wherein the autoconfiguration comprises configuring the second application controller to operate as a relay for the first application controller when the first application controller is not within a primary communication range of the application host.

5. The system of claim 1, further comprising the application host directly connected to and associated with one of the application controllers.

6. The system of claim 1, wherein the wide area network interface of the application host comprises a WAN wireless transceiver.

7. The system of claim 6, wherein the WAN wireless transceiver communicates across a digital paging network.

8. The system of claim 1, wherein the wide area network interface of the application host comprises a WAN wire-line interface.

9. The system of claim 1 wherein each of the first and second application controllers interfaces with the respective beverage dispensing device via a serial interface to a beverage dispensing controller.

10. The system of claim 9, wherein each application controller interfaces via the serial interface comprising a beverage dispensing device multi-drop bus.

11. The system of claim 1, wherein the operation data acquired from each beverage dispensing device comprises product dispensing and inventory data.

12. The system of claim 1, wherein the operation data comprises equipment status data.

13. The system of claim 1, further comprising the network operations center maintains a database storing the operation data and provides secure third party access to the database.

14. The system of claim 13, further comprising the secure third party access to the database provided via a web browser connecting across an internet based network.

15. A remote data acquisition and transmission system for beverage dispensing devices, comprising:
- at least first and second application controllers, the first application controller interfacing with a beverage dispensing controller associated with a beverage dispensing device from which operation data is acquired by the first application controller, and the second application controller interfacing with a beverage dispensing controller associated with a beverage dispensing device from which operation data is acquired by the second application controller;
- an application host communicating with at least one of the application controllers via at least one local area network to receive the operation data from the associated beverage dispensing devices, the application host comprising a wide area network interface for communicating with a network operations center;
- the network operations center communicating with the application host via the wide area network to receive the operation data acquired by the first and second application controllers from the associated beverage dispensing devices;
- the first and second application controllers and the application host operating to autoconfigure the local area network upon initialization;
- the first application controller operating as a relay when necessary to establish communication between the application host and the second application controller, such that the first application controller relays the operation data from the associated beverage dispensing device to the application host on behalf of the second application controller;
- the network operations center maintaining a database storing the operation data from the associated beverage dispensing devices and providing third party access to the database;
- the network operations center communicating with the application host via the wide area network to transmit operation data to the first and second application controllers for the associated beverage dispensing devices, the operation data including configuration information, firmware and other information used to operate the associated beverage dispensing devices; and
- the network operations center having at least one device monitoring and control unit.

16. The system of claim 15, further comprising:
- the local area network supported by wireless transmissions; and
- the application host and each application controller comprise a wireless LAN transceiver for communicating via the local area network.

17. The system of claim 15, further comprising:
- the local area network supported by wire-line transmissions; and
- the application host and each application controller comprise a wire-line LAN transceiver for communicating via the local area network.

18. The system of claim 15, further comprising the application host directly connected to and associated with one of the first and second application controllers.

19. The system of claim 15, further comprising the wide area network interface of the application host comprises a narrowband PCS wireless link to connect the local area network with the network operations center.

20. The system of claim 19, further comprising the wireless transceiver communicating across a digital paging network and messages from the application host stored in at least one dedicated message mailbox for access by the network operations center.

21. The system of claim 15, further comprising the wide area network interface of the application host comprises a wireless two way paging network to connect two or more local area networks with the network operations center to establish an efficient and low cost wide area network.

22. The system of claim 15, further comprising each application controller interfaces via a serial interface having at least one direct sensor coupled with a component of at least one beverage dispensing device.

23. The system of claim 15, wherein the operation data acquired from each beverage dispensing device comprises product dispensing and inventory data and cash levels.

24. The system of claim 15, wherein the operation data acquired from each beverage dispensing device comprises equipment status data.

25. The system of claim 15, further comprising the third party access provided to the network operations center via a web browser connecting across an internet based network.

* * * * *